Figure 1:
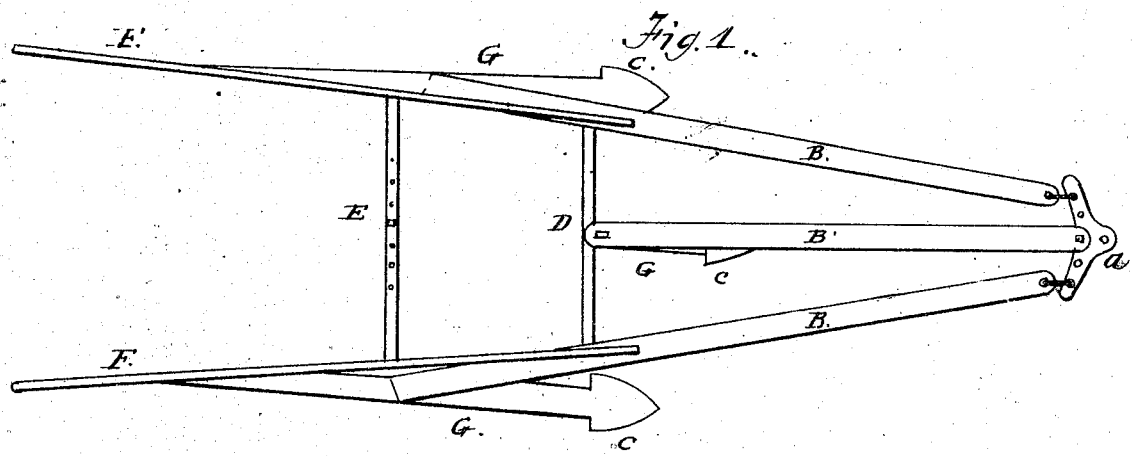
Figure 2:
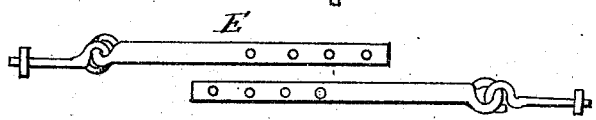
Figure 3:
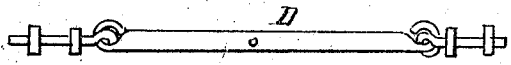

W. R. Adams.
Corn-Cultivator.
№ 75718.  Patented Mar. 24, 1868.

Witnesses
Chas Sturdevant
J. G. Dunlap

Inventor
W. R. Adams.

United States Patent Office.

W. R. ADAMS, OF INDEPENDENCE, MISSOURI.

Letters Patent No. 75,718, dated March 24, 1868.

IMPROVEMENT IN CORN-CULTIVATOR.

The Schedule referred to in these Letters Patent and making part of the same.

TO ALL WHOM IT MAY CONCERN:

Be it known that I, W. R. ADAMS, of the city of Independence, county of Jackson, and State of Missouri, have invented a new and improved Corn-Cultivator; and I do hereby declare that the following is a full and exact description thereof, reference being had to the accompanying drawings, and to the letters of reference marked thereon.

Figure I represents the plan of my invention.

Figures II and III the adjustable connections of the ploughs.

The nature of my invention consists in the construction of a plough or cultivator both simple and cheap, which will, with one man and one horse, cultivate the same amount of corn that can be cultivated with a sulky-plough with two horses, or double the amount cultivated by any other plough or cultivator with the same team.

To enable others skilled in the art to make and use my invention, I will proceed to describe its construction and operation.

I construct two ploughs, with beams B B, handles F F, uprights G G, to which I attach shovels C C, as represented in Fig. I. I also construct a third plough, with a beam, B', about two-thirds the length of the beams B B, to the end of which I attach an upright, G', by a mortise, to which is attached a shovel, C'.

The three sections of the cultivator just described are connected at the front end by a semicircular-shaped plate, $a$, of iron, or any other suitable material, having in it several holes, to enable the operator to regulate the outside shovels, so as to throw the dirt to or from the corn at pleasure. To the centre hole of this plate I attach the end of the beam B', by means of a mortise and an iron bolt. The ends of beams B B are attached by clevises in the outer holes of the plate. In the centre of this plate, and in front of the end of beam B', is a hole in which to put the clevis of whiffle-tree.

I attach the uprights G G by an adjustable slide, of iron, or any other suitable material, as represented in Fig. II, having an eye at each end, in which is put a bolt, by means of a hook, forming a hook-and-eye joint, by which they are bolted together. In the slide are several holes, to enable the operator to adjust the ploughs to rows of different widths. The slides are secured by means of bolts represented by H, Fig. II.

By Fig. III, I represent a cross-piece of iron, or any other suitable material, in the centre of which is a bolt-hole, by means of which it is bolted to upright, G', in a suitable place. These ends are attached to beams B B in the same manner as represented in the slide referred to in Fig. III, with exception of one additional tap on the inside of beams B B, by means of which the piece can be shortened or lengthened at will.

The use of the cross-piece D is to lift the centre shovel out of the ground with either of the other two. The use of the hook-and-eye joints in slides D and E is to enable the cultivator to adjust itself to the unevenness of surfaces, to allow each of the outer shovels, singly or together, to be moved up or down or laterally, or in any direction, so that the operator has complete control of the cultivator.

What I claim, and desire to secure by Letters Patent, is—

1. The semicircular-shaped plate $a$, substantially as described and for the purposes set forth.
2. The cross-piece D, as described, and for the purpose set forth.
3. The adjustable slides E, substantially as described and for the purpose set forth.
4. The combination of these three ploughs, the plate $a$, the cross-piece D, and the slide E, substantially as described and for the purpose set forth.

W. R. ADAMS.

Witnesses:
CHAS. STURDEVANT,
C. G. DUNLAP.